June 26, 1934. J. E. CUSSET 1,964,109
MECHANISM FOR ACTUATING WINDSHIELD WIPERS
Filed July 14, 1931 2 Sheets-Sheet 1
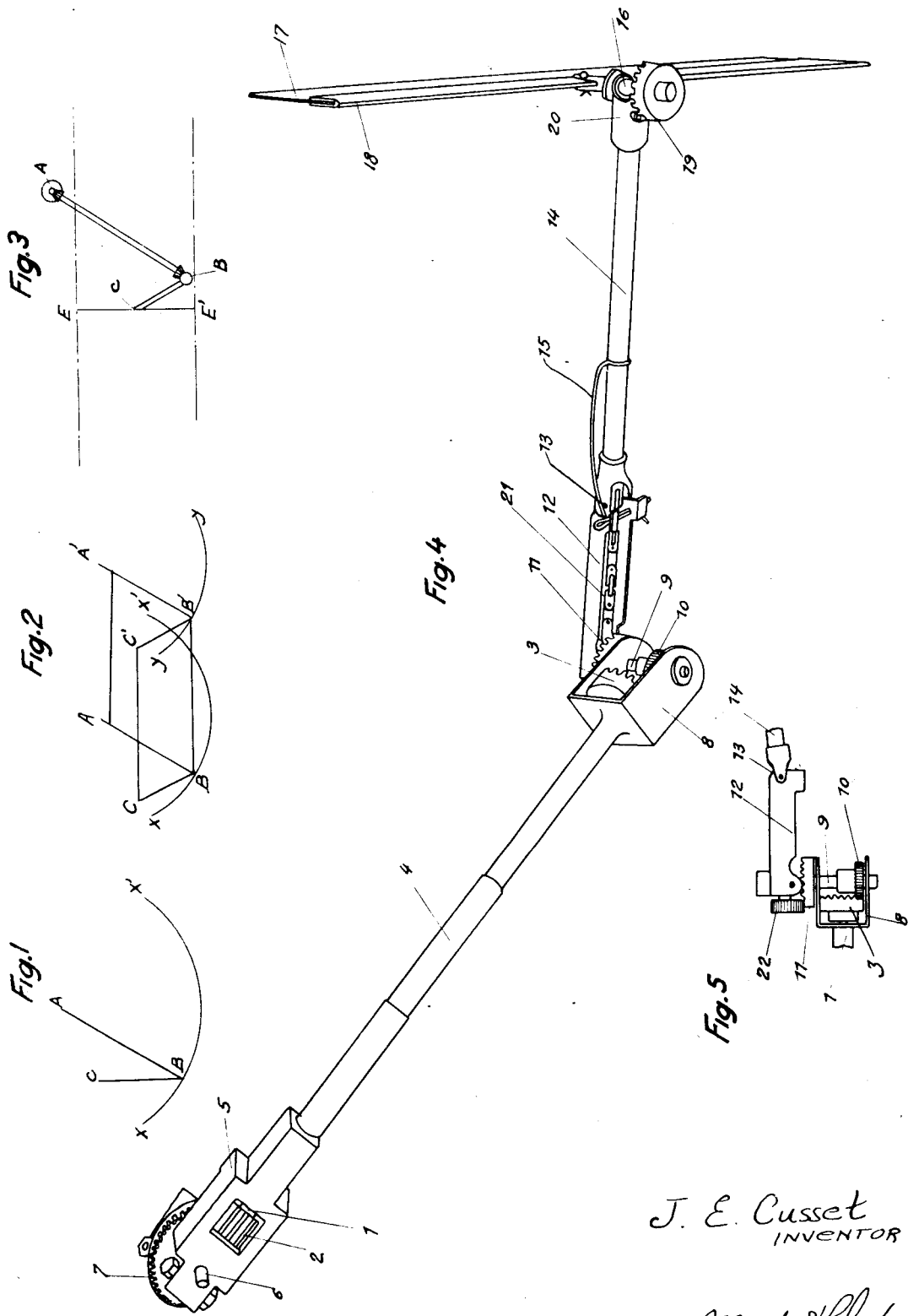
J. E. Cusset
INVENTOR
By: Marks & Clerk
Attys.

June 26, 1934.   J. E. CUSSET   1,964,109
MECHANISM FOR ACTUATING WINDSHIELD WIPERS
Filed July 14, 1931   2 Sheets-Sheet 2
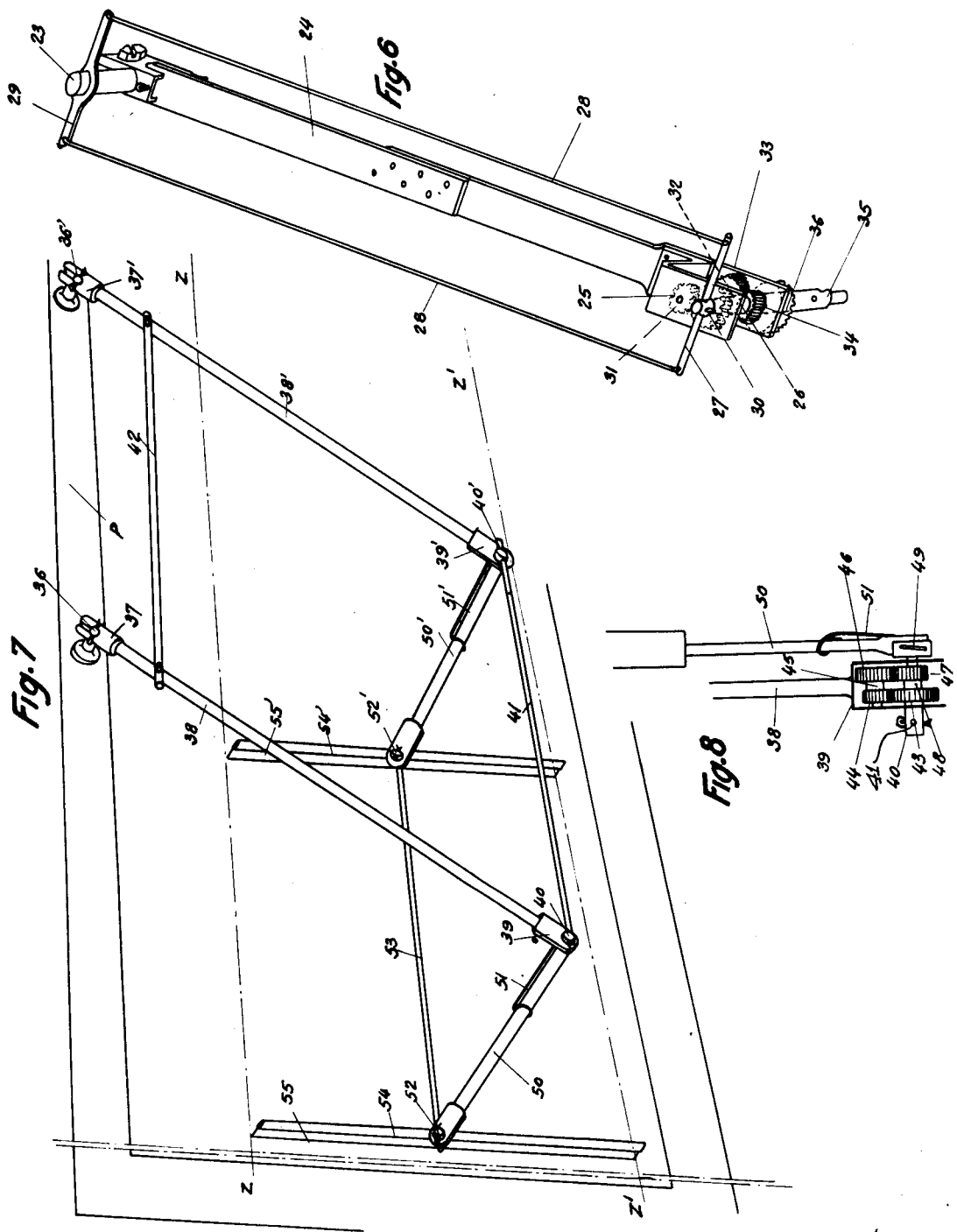

Patented June 26, 1934

1,964,109

UNITED STATES PATENT OFFICE 1,964,109

MECHANISM FOR ACTUATING WINDSHIELD WIPERS

Jules Emilien Cusset, Paris, France

Application July 14, 1931, Serial No. 550,747
In France July 16, 1930

5 Claims. (Cl. 15—251)

The present invention relates to windshield wipers for automobiles, and has for its primary object to provide a mechanism of this character capable of being used in connection with single or duplicate windshield wipers for the purpose of wiping a substantially rectangular elongated zone or area of the windshield surface and consequently of providing a vast field of vision of convenient outline for the driver or other occupants of the automobile.

A further object of the invention is to provide a mechanism for actuating single or duplicated windshield wipers or similar oscillating devices, made up of a relatively small number of parts, easy and cheap to manufacture and to assemble on the windshield of an automobile or on a similar structure, and capable of being operated in any approved way, by a prime mover of electric, pneumatic or other suitable nature without requiring any change in the construction of the windshield or other structure.

A still further object of the invention is to provide a simple and rugged mechanism utilizable particularly for actuating windshield wipers of automobiles and based on operative and constructional principles allowing it to be carried into industrial practice to suit all kinds or sizes of windshields while fulfilling the aforesaid primary object.

Other objects and advantages of the invention will incidentally appear from the following detailed description which will enable it to be more easily understood and carried into effect.

The operative principle on which the mechanism of the invention is based resides in the mechanical conversion of a reciprocating angular or rocking movement represented graphically by an arc whose center coincides with the stationary pivotal center from which the mechanism is operated, into a substantially rectilinear movement represented by a curve of very long radius approximating a straight line perpendicular to the bisecting line of the sector delineated by the said arc, this curve of very long radius being the locus of the several positions taken by the free end of a straight line the other end of which pivots about the end of the swinging radius that sweeps said sector, in the same direction of travel as said radius but at a quicker angular speed and in a reverse angular direction.

From the constructional point of view and assuming for example the case of a windshield wiper for automobiles, the mechanism of the invention is characterized, in its simplest embodiment, by two unequal arms: a longer or primary arm mounted, preferably at one end, on the rocking shaft i. e. on the shaft whence the mechanism is operated, which shaft may be located at the top or at the base of the windshield, and a shorter or secondary arm carrying the wiper at one of its ends, these two arms being pivotally related to each other, preferably at or adjacent their free ends, and dynamically connected through such means that the swinging movement of the longer arm is communicated to the shorter arm in the same general direction of travel but under a certain amplification and in a reverse angular direction, the said means comprising for example pinions, connecting rods or links, a chain, a set of pulleys, a belt, a rack or equivalent members and deriving its impulse from said rocking shaft, other means being associated with the shorter arm for holding the wiper carried thereby vertical throughout its stroke.

The mechanism of the invention may be single that is to say made up of only two unequal pivotally related arms, the shorter arm, in the event of a windshield wiper, being terminally fitted with a wiper so pivotally carried as to remain constantly vertical. It may also be duplicated that is to say made up of two pairs of unequal arms: two longer or primary arms braced to each other and pivotally related respectively to two shorter or secondary arms which may be braced so that the unit constitutes two toggle systems undergoing co-ordinated but oppositely directed distortions, the shorter arm or each shorter arm pivotally connected to its respective longer arm being swung in the same general direction of travel as said longer arm but at a quicker speed and in a reverse angular direction.

The accompanying drawings will allow the invention to be more easily understood and carried into practice, it being understood that the embodiments or constructional forms of the invention illustrated in said drawings are not limitative of same.

Figure 1 is a draught which shows, in the event of a two-armed mechanism for actuating single windshield wipers, the swinging movement of the longer arm AB about the point A (which in the mechanical embodiment will be the rocking shaft) and the swinging movement in the same general direction of travel that is to say towards the left or towards the right as the case may be, of the shorter arm BC about the point B which moves along the arc $x$—$x$ described from the center A.

Figure 2 is a similar draught which shows, in the event of a mechanism comprising two pairs of arms, the swinging movement of the longer arms AB and A'B' about their points A and A' (which, in the mechanical embodiment, may be two coordinated rocking shafts) and the parallelogrammic swinging movement in the same general direction of the shorter arms BC and B'C' about the points B and B' which respectively move along the arcs x—x' and y—y described from the respective centers A and A'.

Figure 3 is a diagram corresponding to the hypothesis shown in Figure 1 but showing in a simplified way how, mechanically, the swinging movement imparted by the rocking shaft A to the longer arm AB which is here represented in the form of a rod fitted at either ends with a bevel pinion may be transmitted under a certain amplification to the shorter arm BC represented by a rod carrying at its free end a wiper E—E', the means used by way of example consisting in mounting on the shaft A a bevel gear meshing with the upper bevel pinion of the arm AB and on the shaft B a smaller bevel wheel meshing with its lower bevel pinion. The two parallel chain lines illustrating the paths of the ends E and E' of the wiper show that the latter moves between two horizontal lines that is to say sweeps a rectangular area, this being the result obtainable by the invention.

Figure 4 is a perspective view of a constructional form of a two-armed mechanism according to the invention utilizable for the actuation of a single windshield wiper for automobiles, this view being adapted to exemplify how the invention can be carried into practice.

Figure 5 is a fragmentary view showing the details, on the one hand, of the pivotal connection between the two arms of the mechanism shown in Fig. 4 and of a primary gear adapted to transmit the angular or swinging movement of the longer arm to the shorter arm and, on the other hand, of a secondary gear adapted to maintain the wiper in a substantially vertical position throughout the stroke of the shorter arm.

Figure 6 is a perspective view of a modified embodiment of the two-armed mechanism the principle of which is shown in Fig. 3, this modification having reference to the gear that transmits the rocking movement of the actuating shaft from the longer arm to the shorter arm.

Figure 7 is another perspective view of a mechanism comprising two pairs of companion arms utilizable for operating duplicated windshield wipers for automobiles, this view being intended to exemplify how the invention may be carried into practice in case of duplicated windshield wipers.

Figure 8 is a fragmentary view showing in detail each of the two pivotal connections or articulations arranged between the longer arms and the shorter arms of the duplicated mechanism shown in Fig. 7 and the gear adapted to amplify the angular displacement of each longer arm in order to cause a quicker swinging movement of the shorter arm.

Like reference characters designate like parts throughout the several views.

According to the embodiment shown in Figure 4, the longer or primary arm of the mechanism, designated geometrically by AB in Figure 1, is constituted by a rod 1 provided at its upper end with a spur pinion 2 and at its lower end with a toothed wheel 3. This rod 1 passes through a sleeve 4 engaged at its top end into an apertured block 5 accommodating the pinion 2 and formed with a hole whereby it can be keyed to any actuating rocking shaft 6 located at the top or at the base of the windshield of an automobile (in the event of a mechanism adapted to operate a windshield wiper) a shaft 6 being loosely mounted in the hub of a stationary toothed wheel 7 in mesh with the pinion 2. The sleeve 4 is fitted at its lower end with a bifurcated yoke 8 in which is housed the toothed wheel 3 and through the limbs of which is journalled a pin 9 provided with a pinion 10 meshing with said wheel and journalled, outside the yoke 8, in another toothed wheel 11 fixed to said yoke. On the pin 9 and beyond the wheel 11 is rigidly secured a channel member 12 which forms, as will presently appear, the primary element of the shorter or secondary arm of the mechanism (designated geometrically by BC in Figure 1). Upon the channel member 12 is pivotally connected at 13 a sleeve 14 subjected to the outward push of a spring 15 and formed at right angles to its free end with two aligned holes in which is journalled a bifurcated pin 16. Between the legs of this pin is held, preferably removably by means of a cotter pin allowing a back and forth motion, a wiper constituted, as usual, by a strip 17 of rubber or similar substance held in a channel member 18. On the pin 16 is keyed on the end opposite to the end carrying the wiper a toothed wheel 19 meshing, owing to an aperture formed in the sleeve 14, with a pinion 20 keyed upon the end link of a flexible chain shaft 21 housed partly in said sleeve and partly in the channel member 12 and fitted at its opposite end with a pinion 22 (Fig. 5) meshing with the toothed wheel 11.

The operation of the mechanism as constructed according to this first embodiment of the invention is as follows: Assuming, as above-stated, the shaft 6 (corresponding to the point A of Fig. 1 and constituting the actual actuating shaft of ordinary windshield wipers) to be imparted a reciprocatory rotary i. e. rocking movement by any source of energy of electric, pneumatic or other nature, it will be seen that the said rotation communicates a uniform swinging movement to the sleeve 4 and simultaneously a rotary movement to the pinion 2 owing to the latter permanently meshing with the stationary toothed wheel 7. The rotation of the pinion 2 which is concomitant with the swinging movement of the sleeve 4 causes rotation of the rod 1, toothed wheel 3, pinion 10 and pin 9 and therefore imparts to the shorter arm of the mechanism a swinging movement in the direction in which its longer arm oscillates. At the same time, the rotation of the pin 9 (representing the geometrical point B in Fig. 1) is translated into a rotation of the pinion 22 about the stationary wheel 11. By thus rotating, the pinion 22 causes rotation of the flexible chain shaft 21, pinion 20, toothed wheel 19 and pin 16 carrying the wiper 17—18. Intermediate the toothed wheel 7 and the pin 9 there is provided in the present embodiment a gear adapted to multiply and transmit the motion so that the swinging movement of the shorter arm 12—14 takes place in the same general direction of travel as the swinging movement of the longer arm 4 but in a reverse angular direction and at such a quicker angular speed that the locus of the positions occupied by the pin 16 carrying the wiper substantially approximates a horizontal straight line. Thus the wiper 17—18 which remains vertical throughout its stroke can clean a vast area of the windshield inside a substantially rectangular surface which is parallel to its upper and lower edges.

According to the embodiment of the invention as shown in Fig. 6, the rocking shaft which actuates the mechanism (representing geometrically speaking the point A in Fig. 1) is engaged in a socket 23 clamped in the end of a bar 24 terminating at its opposite end in the form of a yoke 25 in the one leg of which is journalled a shaft 26 on which is pinned a short beam 27. Both ends of this beam are pivotally connected to two parallel links 28, 28 pivotally connected at their opposite ends to another short beam 29 pivotally mounted on the socket 23. The unit 27—28—28—29 thus forms a toggle system. The upper beam 29 is held stationary upon the windshield by any suitable form of clamp or securing device. On the shaft 26 is keyed a pinion 30 meshing with a pinion 31 keyed on a transmission shaft 32 carrying a pinion 33 meshing with a pinion 34 keyed upon a shaft 35 journalled, on the one hand, in the hub of the pinion 30 and, on the other hand, in the adjacent leg of the yoke 25. Against the outer wall of said leg is rigidly secured a toothed wheel 36 in mesh with a pinion carried by the shorter arm (not shown) of the mechanism, said arm being keyed on the shaft 35. The gears 30—31—33—34 involve an amplification of the movement which is reckoned according to the functional characteristics of the mechanism.

The operation of this second embodiment of the invention is as follows: Assuming, as above-stated, the usual rocking shaft (corresponding to the point A of Fig. 1) to be clamped in the socket 23, it causes the bar 24 (constituting the longer arm AB of the mechanism) to swing. As the beam 29 is stationary, this swinging movement causes a reciprocatory rotation of the shaft 26 on which is keyed the opposite beam 27 and consequently of the pinion 30. As a result of this and owing to the action of the gears 31, 33 and the pinion 34, the shaft 35 and therefore the shorter arm of the mechanism which is keyed thereupon rotate in the same direction of travel but at a quicker angular speed According to the embodiment of the invention as shown in Fig. 7, which reproduces mechanically by way of example the geometrical sketch of Fig. 2, not one actuating shaft but two co-ordinated actuating shafts 36, 36' are provided, these shafts being rocked by one or two electric, pneumatic or other suitable motors located on one of the edges of the windshield P. Each of these shafts is clamped in a socket 37, 37' formed at the end of a rod 38, 38' the opposite end of which is yoke-shaped at 39 or 39'. In the outer legs of these yokes are journalled pins 40, 40' fixedly connected by a cross rod 41. The two rods 38, 38' (corresponding to the lines AB and A'B' of Fig. 2 and constituting the longer arms of this duplicated mechanism) are connected intermediate their ends by a pivoted rod 42 parallel to the rod 41 whereby the unit 38—41—38'—42 forms a toggle system which is distorted by the swinging movement of the rods 38 and 38' under the action of the shafts 36, 36'. On the pin 40 is keyed a pinion 43 in mesh with a pinion 44 keyed on a transmission shaft 45 carrying another pinion 46 meshing with a pinion 47 keyed on a pin 48 journalled, on the one hand, in the pinion 43 and, on the other hand, in the inner leg of the yoke 39. This arrangement is shown in detail for the yoke 39 in Fig. 8 and is identically duplicated for the companion yoke 39'. As in Fig. 6, an amplification is provided from the pinion 43 to the pinion 47 that rotates in the same direction. On the pin 48 is angularly fixed but mounted for pivotal motion back and forth owing to a cotter 49 the one shorter arm 50 of the mechanism, the other shorter arm 50' being mounted in the same way. Springs 51, 51' are provided for constantly forcing the shorter arms 50, 50' towards the windshield while allowing a certain flexibility thereof. The arms 50, 50' carry by their free ends, which are advantageously enlarged, pins 52, 52' fixedly connected to a cross rod 53 and each fitted with a channel member 54 or 54' carrying the wiper proper 55 or 55' which is made of rubber or similar substance.

The operation of this third embodiment of the invention is as follows: Assuming the two co-ordinated rocking shafts 36, 36' (corresponding to points A, A' of Fig. 2) to be clamped in the sockets 37, 37', these shafts impart a swinging movement to the longer arms of the mechanism. As, owing to the cross rod 41 secured to the pins 40, 40', the latter can not revolve individually while the yokes 39, 39' partake of the said swinging movement, the pinions 43, 43' keyed upon said pins cause the pinions 47, 47' to rotate in the same direction but under the predetermined amplification that is to say revolve the pins 48, 48' and the shorter arms 50, 50' of the mechanism which are, angularly speaking, fixed thereto. It follows that the swinging movement of the toggle system 38—41—38'—42 is transmitted in the same general direction of travel but over an increased range to the shorter arms 50, 50'. By this means, the wipers 54—55 and 54'—55' which are held vertically throughout their strokes since the pins 52 and 52' carried thereon are fixedly connected by the cross rod 53 are constrained to cover or sweep a substantially rectangular area delineated between the chain lines Z—Z and Z'—Z'.

It will be appreciated that the respective lengths of the longer and shorter arms of the mechanism can be easily determined before hand by calculation, taking into account the operative conditions thereof. As these operative conditions may change to suit the particular size and type of windshield to which the mechanism must be fitted, the longer arm and/or the shorter arm are, in each instance, advantageously of adjustable length, for example by forming them of telescopic tubes.

It will further be understood that the calculation of the gear or other transmission adapted to amplify the swinging movement from the longer arm or arms to the shorter arm or arms is an easy geometrical problem to solve in accordance with the functional characteristics of the mechanism as set forth.

Numerous constructional details might of course be altered without departing from the spirit of the invention, particularly as regards the respective positions occupied by the pivotal connections of the arms, by the gear or other transmission provided between them for amplifying the swinging movement from the longer arm or arms to the shorter arm or arms, and by the means for holding the wiper or wipers vertically and in resilient contact with the windshield, all the alterations thus contemplated being included in the scope of the subjoined claims.

What I claim is:

1. A mechanism for actuating windshield wipers comprising a rocking shaft mounted on the windshield, a primary arm fixedly connected at one end thereof with the shaft, a secondary arm having its inner end pivotally connected with the other end of the primary arm, a wiping element pivotally connected to the other end of the secondary arm, a primary gear train carried by the primary arm, means fixed on the windshield for driving said primary gear train upon swinging of the primary arm, a secondary gear train carried by the secondary arm and engaging the primary gear train at the pivotal connection of the primary and secondary arms, and a gear connection between the secondary arm and the wiping element, said gear connection being driven by the secondary gear train during oscillation of the primary arm to move the wiping element in a substantially rectilinear path.

2. A mechanism for actuating windshield wipers comprising, in combination, a rocking shaft located at a stationary position on the windshield and connected to a prime mover, a primary arm having one end rigidly connected to the rocking shaft to receive a swinging movement therefrom, a secondary arm of shorter length having one end pivotally connected to the primary arm at a position spaced from the rocking shaft, a wiping element pivotally connected to the other end of the secondary arm and co-ordinated means on the primary and secondary arms connected at one end to the wiping element, and at the other end to a part fixed relative to the windshield for imparting to the secondary arm responsive to the swinging movement of the primary arm a swinging movement of similarly directed path but quicker angular speed and reverse angular direction, the relative lengths of the two arms and the transmission ratio of said co-ordinated means being such as to cause the end of the secondary arm carrying the wiping element to describe a substantially rectilinear path while causing said element to travel in constant parallelism to itself and to sweep a rectangular area.

3. A mechanism for actuating windshield wipers comprising, in combination, a rocking shaft located at a stationary position on the windshield and connected to a prime mover, a primary arm rigidly connected adjacent one of its ends to the rocking shaft to receive a swinging movement therefrom, a secondary arm of shorter length pivotally carrying at one end the wiping element and pivotally connected adjacent its opposite end to the primary arm at a position spaced from the rocking shaft, spring means for resiliently pressing the wiping element against the windshield, a stationary gear on the windshield, a pinion carried by the primary arm and in mesh with said gear, gear trains between the primary arm and secondary arm and connections carried by said arms connecting the gear trains to a stationary part and the wiping element respectively for imparting to said wiper a motion to sweep substantially said rectangular area.

4. A mechanism of the character described comprising a shaft adapted to be oscillated by an extraneous power, a support, a hollow primary arm having its inner end keyed to said shaft, means on said support fixedly held relative thereto and to said arm, a second arm shorter than said primary arm and having its inner end pivoted to the outer end of the primary arm, the primary arm being bifurcated at its outer end and having a gear wheel in said bifurcation, connections in the primary arm operated by said fixed means when the arm is oscillated for operating said gear wheel in said bifurcation, a pinion in the bifurcation of the primary arm having an axle within the bifurcation, said pinion being operated by said gear wheel in the bifurcation, a wiper pivoted to the outer end of the secondary arm and carrying a gear wheel rigid therewith, and connections between the pinion in the bifurcation in the primary arm and said gear wheel rigid with the wiper for operating said wiper during oscillation of the primary arm in a substantially rectangular path.

5. A mechanism of the class described comprising a shaft oscillatable by an extraneous power, a support therefor, a gear wheel held fixedly on said support during the oscillation of said shaft, a primary arm keyed at one end to said shaft and having a pinion geared to said fixed gear wheel, said arm carrying at its other end a gear train and connections between the gear train and pinion and operated by said pinion, said arm having a shorter second arm pivoted at its inner end thereto, a wiper pivoted to said second arm at its outer end and carrying a gear wheel rigid therewith and connections from said gear train to said gear wheel rigid with the wiper, the parts of the gear train being so proportioned that the oscillation of the primary arm and its pinion operates the gear rigid with the wiper to impart a substantially rectilinear motion to said wiper and through the connections between the pivoted arms moves the wiping element in a substantially rectilinear path.

JULES EMILIEN CUSSET.